US009229531B2

(12) United States Patent
Cordier et al.

(10) Patent No.: US 9,229,531 B2
(45) Date of Patent: Jan. 5, 2016

(54) HAPTIC CONTROL DEVICE INCLUDING A SEAL

(75) Inventors: Emmanuel Cordier, Grendelbruch (FR); Yannick Molard, Hersbach (FR)

(73) Assignee: Delphi Technologies, Inc., Troy, MI (US)

( * ) Notice: Subject to any disclaimer, the term of this patent is extended or adjusted under 35 U.S.C. 154(b) by 432 days.

(21) Appl. No.: 13/992,529

(22) PCT Filed: Nov. 30, 2011

(86) PCT No.: PCT/EP2011/071436
§ 371 (c)(1),
(2), (4) Date: Jun. 7, 2013

(87) PCT Pub. No.: WO2012/079990
PCT Pub. Date: Jun. 21, 2012

(65) Prior Publication Data
US 2013/0257603 A1 Oct. 3, 2013

(30) Foreign Application Priority Data

Dec. 13, 2010 (FR) ...................................... 10 60437

(51) Int. Cl.
*B60K 37/04* (2006.01)
*G06F 3/01* (2006.01)
(Continued)

(52) U.S. Cl.
CPC ................ *G06F 3/016* (2013.01); *B60K 35/00* (2013.01); *G06F 1/1601* (2013.01); *B60K 2350/1028* (2013.01)

(58) Field of Classification Search
CPC ....... G06F 3/016; G06F 1/1601; B60K 35/00; B60K 2350/1028

USPC ............ 345/173, 156, 178; 340/407.1, 407.2, 340/4.12; 341/21, 27; 463/30
See application file for complete search history.

(56) References Cited

U.S. PATENT DOCUMENTS 6,020,867 A * 2/2000 Shimada .............. G02B 6/0086
345/87
6,532,152 B1 * 3/2003 White ............... G02F 1/133308
312/223.1
(Continued)

FOREIGN PATENT DOCUMENTS

DE    10 2008 058 566 A1    5/2010
EP         0 293 291 A1    11/1988
(Continued)

OTHER PUBLICATIONS

International Search Report dated Jan. 20, 2012.

*Primary Examiner* — Daniel Wu
(74) *Attorney, Agent, or Firm* — Lawrence D. Hazelton

(57) ABSTRACT

Haptic control device that includes a tactile panel mounted movably relative to a support including a peripheral wall, characterized by the fact that a seal is arranged on the periphery of the tactile panel in an annular space situated between the tactile panel and the peripheral wall of the support, the seal including: an inner portion in tight contact with the tactile panel, an outer portion in tight contact with the peripheral wall of the support, and a connecting portion that extends between the inner portion and the outer portion and is elastically deformable so as to absorb the relative displacements of the tactile panel relative to the peripheral wall of the support without removing the haptic effect produced by the movements of the tactile panel.

14 Claims, 3 Drawing Sheets

(51) Int. Cl.
*G06F 1/16* (2006.01)
*B60K 35/00* (2006.01)

(56) References Cited

U.S. PATENT DOCUMENTS

2006/0146036 A1 7/2006 Prados et al.
2006/0192657 A1* 8/2006 Nishimura ............. G06F 3/016
340/407.2
2011/0102343 A1* 5/2011 Imai ...................... G06F 1/1643
345/173
2011/0221703 A1 9/2011 Dietz et al.

FOREIGN PATENT DOCUMENTS

| EP | 1 310 860 A1 | 5/2003 |
| EP | 2 249 226 A1 | 11/2010 |
| WO | 2006/074712 A2 | 7/2006 |

* cited by examiner

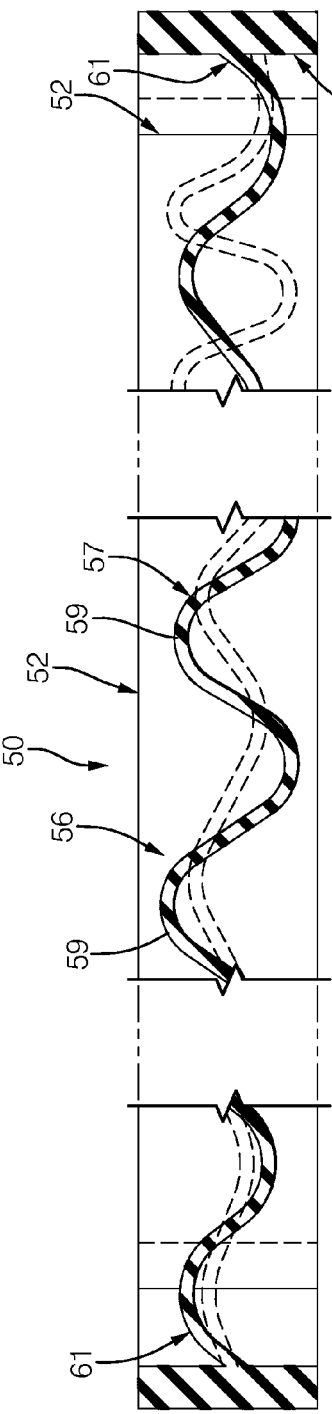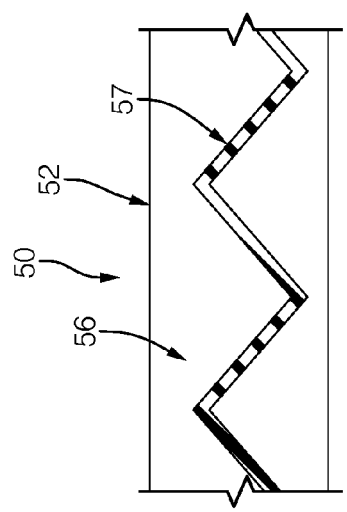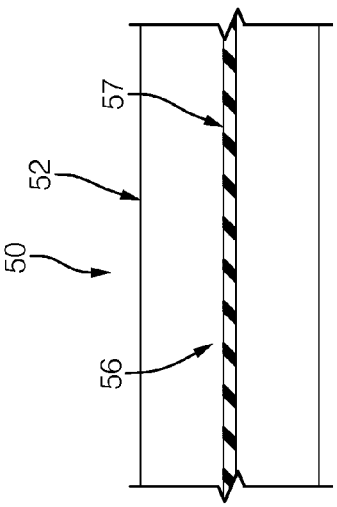
FIG. 3
FIG. 4
FIG. 5

HAPTIC CONTROL DEVICE INCLUDING A SEAL

CROSS-REFERENCE TO RELATED APPLICATION

This application claims the benefit under 35 U.S.C. §371 of published PCT Patent Application Number PCT/EP 2011/071436, filed Nov. 30, 2011 and claims priority to French Patent Application 1060437 filed Dec. 13, 2010, and published as WO2012/079990 Jun. 21, 2012, the entire contents of which is hereby incorporated by reference herein.

TECHNICAL FIELD OF INVENTION

The present invention relates to a haptic control device, in particular for a motor vehicle.

BACKGROUND OF INVENTION

The present invention relates more particularly to a haptic control device that includes a tactile transversal panel mounted movably relative to a fixed support. The support, which can have the form of a case, includes a peripheral wall that surrounds the tactile panel and extends generally towards the front in an axial direction at right-angles to the plane of the tactile panel. The tactile panel is provided with at least one tactile zone at the front and at least one drive system. When a switching signal is triggered following brushing of the tactile zone by the finger of a user, the tactile panel is driven by the drive system in the plane of the tactile panel performing movements relative to the support, for example in a predefined rhythm. A display screen is arranged on the support, behind the tactile panel, so that the user can control functions by brushing the tactile zone, for example depending on what is displayed on a zone of the screen situated directly in line with the brushed tactile zone.

Such a type of haptic control device is described for example in the document US 2008/0111788A1.

A problem encountered in the use of this type of device is the tightness of the mounting. This point is particularly critical in the case of motor vehicle applications in which the haptic control device is mounted on the dashboard of the vehicle and can be exposed to dust and projections of liquid. This tightness is difficult to achieve in particular due to the movements of the tactile panel relative to the support.

SUMMARY OF THE INVENTION

The present intention is intended to resolve the problems mentioned above by proposing a simple, effective, and economical sealing solution.

To this end, the invention proposes a haptic control device, in particular for a motor vehicle, that comprises a tactile transversal panel mounted movably relative to a fixed support, the support including a peripheral wall that surrounds the tactile panel and generally extends towards the front in an axial direction at right-angles to the plane of the tactile panel, the tactile panel being provided with at least one tactile zone at the front and at least one drive system, a switching signal being able to be triggered when the tactile zone is brushed in such a manner that the tactile panel is driven by the drive system in the plane of the tactile panel performing movements relative to the support, characterized by the fact that a seal is arranged on the periphery of the tactile panel, in an annular space situated between the tactile panel and the peripheral wall of the support, the seal including: an inner portion in tight contact with the tactile panel, an outer portion in tight contact with the peripheral wall of the support, and a connecting portion that extends between the inner portion and the outer portion and is elastically deformable so as to absorb the relative displacements of the tactile panel relative to the peripheral wall of the support without removing the haptic effect produced by the movements of the tactile panel.

The seal in accordance with the invention allows prevention of the penetration of dusts or liquids between the tactile panel and the peripheral wall of the support, while allowing the tactile panel a sufficient freedom of movement to produce the required haptic effect in the haptic control device. Indeed, it is important not to excessively dampen the movements of the tactile panel relative to the support at the risk of removing the haptic effect. The choice of a suitable material and of a suitable profile for the connecting portion contributes to the obtaining of this result. The structure of the seal in accordance with the invention is particularly advantageous as it allows localization of the elastic deformation in the connecting portion so that by modifying the flexibility and elasticity of the connecting portion the required result is obtained.

The seal according to the invention also constitutes a particularly compact solution to resolve the seal problems since it occupies a very small volume relative to the general volume of the tactile panel.

In accordance with other characteristics of the invention: the inner portion of the seal includes an axial skirt that extends substantially in parallel with the adjacent wall of the tactile panel and is flattened against the adjacent wall of the tactile panel; the tactile panel includes a touchscreen that is mounted on a peripheral framework in the form of a frame, the framework including an outer axial wall, and the axial skirt is flattened against the outer axial wall of the framework; the outer portion of the seal is formed of an axial partition that extends generally in the extension of the peripheral wall of the support towards the front; the outer face of the peripheral wall of the support includes a shoulder surface orientated towards the front and a rear end section of the outer portion of the seal is mounted bearing against the shoulder surface; the outer portion of the seal is mounted clamped onto the peripheral wall of the support; the connecting portion generally has the form of a transversal partition; the connecting portion includes a profile elastically deformable in a transversal drive direction of the tactile panel relative to the support; the elastically deformable profile generally has an undulated form of sinusoidal type in an axial plane parallel with the transversal drive direction; the elastically deformable profile extends along the longitudinal segments of the connecting portion, on either side of the tactile panel, in parallel with the transversal drive direction, and the elastically deformable profile extends in the width of the lateral segments, on either side of the tactile panel; a cover in the form of a frame is mounted on the peripheral wall of the support so as to define internally an accessible zone of the tactile panel, the cover being mounted bearing axially against the top of the seal; the cover includes on its rear transversal face a groove that is designed to receive an axial extension of the outer portion of the seal; the inner portion of the seal includes an inner transversal extension that is interposed between the framework and the cover; a display screen is arranged between the tactile panel and a back wall of the support; and the seal is made of material of the silicone type.

BRIEF DESCRIPTION OF DRAWINGS

Other characteristics, aims and advantages of the invention will become apparent on reading the following detailed description, and with reference to the attached drawings, given by way of non-limiting example and in which:

FIG. 3 is an enlarged partial view in axial section along the section plane 3-3 that shows the seal of the haptic control device of FIG. 1 in which a connecting portion includes an undulated profile;

FIG. 4 is a similar view to that of FIG. 3 that shows a modified embodiment of the seal in which the connecting portion includes a profile formed of triangular shapes; and FIG. 5 is a view similar to that of FIG. 3 that shows a modified embodiment of the seal in which the connecting portion includes a flat profile.

DETAILED DESCRIPTION

In the remainder of the description, identical or similar elements can be designated by the same references.

Figure 1:
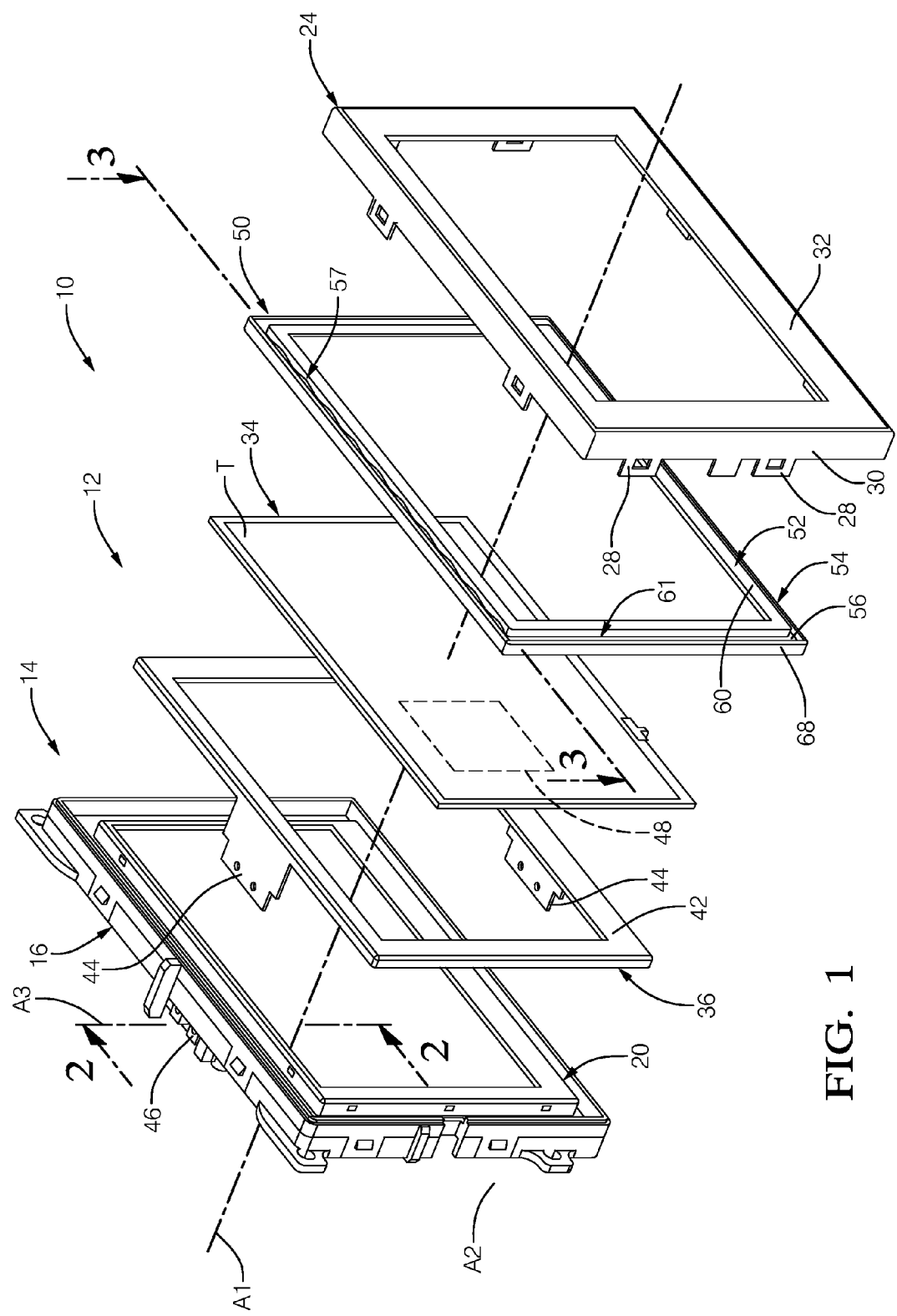
FIG. 1 is an exploded perspective view that shows a haptic control device fitted with a seal in accordance with the teachings of the invention.
Figure 2:
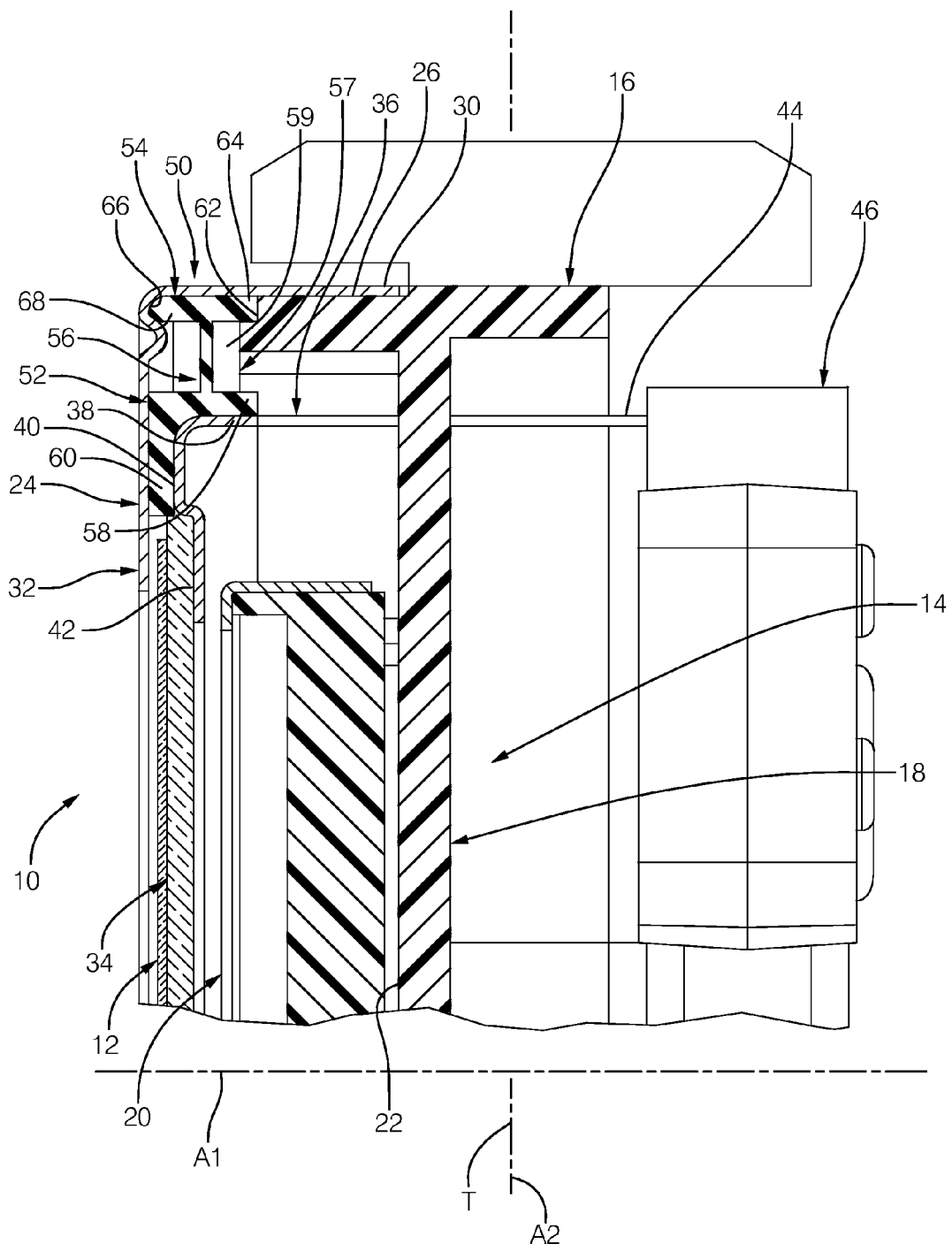
FIG. 2 is an enlarged partial view in axial section along the section plane 2-2 that shows a portion of the haptic control device of FIG. 1.

In FIGS. 1 and 2, a haptic control device 10 has been shown that is made in accordance with the teachings of the invention. This device 10 is designed to be mounted, for example, on the front face of the dashboard of a motor vehicle (not shown), in order to allow the driver to control different functions of his vehicle. The haptic control device 10 here has generally the form of a parallelepipedal case that extends in a transversal plane T.

In the remainder of the description, a transversal orientation will be used in non-limiting manner in a general plane of the haptic control device 10, and an axial orientation A1 in a direction at right-angles to the transversal plane T orientated from the rear towards the front, which generally corresponds to an orientation from left to right looking at FIG. 1, and from bottom to top looking at FIG. 2. In a transversal plane T, elements will be qualified as inner or outer depending on whether they are orientated towards the inside or towards the outside of the haptic control device 10.

According to the embodiment shown, the haptic control device 10 includes a tactile transversal panel 12 mounted movably relative to a fixed support 14.

The support 14 is here formed of a case element including a peripheral axial wall 16 and a transversal back wall 18 at the rear.

A display screen 20 is fixed on the front face 22 of the back wall 18. The display screen 20 is for example a liquid crystal screen that extends generally in a transversal plane under the tactile panel 12.

A cover 24 in the form of a frame is mounted on the outer face 26 of the peripheral wall 16 of the support 14, for example by fitting together elastically by means of fixing tongues 28. The cover 24 includes an outer axial wall 30 that extends towards the rear against the outer face 26 of the peripheral wall 16, and a portion of inner transversal wall 32 that defines a frame corresponding to a zone of the tactile panel 12 accessible to a user for control. Thus, the cover 24 in the form of a frame here generally has an L-shaped profile as shown in FIG. 2.

The tactile panel 12 here includes a rectangular touchscreen 34 that is fixed on a peripheral framework 36 in the form of a rectangular frame. The framework 36 includes an outer axial wall 38 that extends towards the rear and an inner transversal wall 40 that is provided with an inner recess towards the rear so as to form a rectangular housing 42 for the touchscreen 34.

In accordance with the embodiment shown, the framework 36 is provided at the rear with two drive arms 44 that are arranged on two opposite sides of the frame formed by the framework 36 and are linked to a drive system 46. The two drive arms 44 are here in the form of thin plates so as to be able to extend in a transversal space between the edge of the display screen 20 and the peripheral axial wall 16 of the support 14 and so as to be able to be displaced in a transversal drive direction A2 parallel with said edge of the display screen 20. The framework 36 is for example made of sheet metal by stamping and folding.

The drive system 46 is here formed of two electrical actuators that are mounted on the rear face of the back wall 18. The drive system 46 is designed to produce movements of the tactile panel 12 of an amplitude of some tenths of a millimeter.

The touchscreen 34 includes on its front face at least one tactile zone 48 that is designed to trigger a switching signal when it is brushed, for example by the finger of a user, so that the tactile panel 12 is driven by the drive system 46 and the framework 36 in the plane of the tactile panel 12 performing movements, in the transversal drive direction A2, relative to the support 14. These movements are performed in a rhythm that can be predefined depending on the required haptic effect. They correspond for example to reciprocating transversal movements of small amplitude relative to the general dimensions of the tactile panel 12. These movements of the tactile panel 12 allow the user to be provided with a force-feedback confirming to him, for example, the selection or validation of a particular function of the haptic control device 10.

In accordance with a modified embodiment, the touchscreen 12 can also be driven in a transversal direction A3 at right-angles to the transversal drive direction A2.

In accordance with the teachings of the invention, a seal 50 is arranged on the periphery of the tactile panel 12, in an annular space situated between the tactile panel 12 and the peripheral wall 16 of the support 14. The seal 50 includes: an inner portion 52 in tight contact with the tactile panel 12 that extends along the outer periphery of the tactile panel 12; an outer portion 54 in tight contact with the peripheral wall 16 of the support 14 that extends along the inner periphery of the peripheral wall 16; and a connecting portion 56 that extends between the inner portion 52 and the outer portion 54 and is elastically deformable so as to absorb the relative displacements of the tactile panel 12 relative to the peripheral wall 16 of the support 14.

The seal 50 is made of a sufficiently flexible material to absorb the relative displacements of the tactile panel 12 relative to the support 14, for example from a material of silicone type, of elastomer type, or of rubber type.

The inner portion 52 of the seal 50 here includes an axial skirt 58 that extends substantially in parallel with the adjacent wall of the tactile panel 12. The adjacent wall of the tactile panel 12 is here formed by the outer axial wall 38 of the framework 36 and the axial skirt 58 is mounted flattened against the said outer axial wall 38 to form a dust- and liquid-tight mounting.

The inner portion 52 of the seal 50 here includes an inner transversal extension 60 that is designed to be interposed between the inner transversal wall 40 of the framework 36 and the inner transversal wall 32 of the cover 24.

The outer portion 54 of the seal 50 is formed by an axial partition that extends generally towards the front in the extension of the peripheral wall 16 of the support 14. A shoulder surface 62, orientated towards the front, is arranged in the outer face of the peripheral wall 16 of the support 14 to receive the rear end section 64 of the outer portion 54 of the seal 50. The transversal depth of the shoulder surface 62 is here substantially identical to the thickness of the rear end section 64 so that the outer surface of the outer portion 54 of the seal is substantially flush with the outer surface of the peripheral wall 16 of the support 14.

The outer portion 54 of the seal 50 can be mounted clamped on the peripheral wall 16 of the support 14. In accordance with a modified embodiment, it can be over-molded on the peripheral wall 16 of the support 14.

In accordance with the embodiment shown, the connecting portion 56 has the form of a partition that extends generally in a transversal plane, from the outer surface of the axial skirt 58 to the inner surface of the outer portion 54 of the seal 50.

In accordance with the embodiment shown in FIGS. 1, 2 and 3, the connecting portion 56 includes two longitudinal segments 57 that extend along the longitudinal edges of the tactile panel 12 in parallel with the transversal drive direction A2, and have an undulated profile of sinusoidal form in an axial plane parallel with the adjacent part of the peripheral wall 16 of the support 14 and in parallel with the transversal drive direction A2, as shown in FIG. 3. The undulations 59 formed by each longitudinal segment 57 permit facilitation of the elastic deformation of the connecting portion 56 in the direction of the transversal drive direction A2, by minimizing the elastic resistance force that opposes the translation triggered by the actuators 46. In fact, the undulations 59 allow addition of the material so that, during the translation of the tactile panel 12, a part of the elastic deformation of the connecting portion 56 is obtained by deformation of the sinusoid, as shown in dashed lines in FIG. 3. The resistance to deformation at the undulations, in the transversal drive direction A2, is less than would be the resistance to stretching and to compression of the material if the longitudinal segments 57 were flat.

In accordance with the embodiment shown in FIG. 3, the lateral segments 61 of the connecting portion 56 that extend in parallel with the transversal direction A3, also have a sinusoidal profile that extends the sinusoidal profile of the longitudinal segments 57, in the direction of the width of the lateral segments 61.

In accordance with modified embodiments, the sinusoidal profile of the longitudinal segments 57 and of the lateral segments 61 can be replaced by another type of profile elastically deformable in the transversal drive direction A2, for example a crenulated profile, or a profile formed of triangular shapes, as shown by FIG. 4.

In accordance with a modified embodiment shown in FIG. 5, the longitudinal segments 57 and the lateral segments 61 of the connecting portion 56 can be flat. In this case the elastic deformation is obtained by stretching and compression of the material forming the connecting portion 56 in the transversal drive direction A2.

The cover 24 is here mounted over the seal 50, so as to cover it entirely and to conceal it from the eyes of the user. The rear face of the inner transversal wall 32 of the cover 24 here includes a peripheral annular groove 66 that runs along the outer axial wall 30 of the cover 24 so as to form a housing for the front axial end section 68 of the outer portion 54 of the seal 50.

The cover 24 is thus mounted bearing axially against the top of the seal 50 that is here formed by the front axial end section 68 and by the front face of the inner transversal extension 60.

In operation, when a switching signal is emitted, it causes at least a movement of transversal translation of the tactile panel 12 along the transversal displacement axis A2 towards a transversal end of the support 14, for example to the right looking at FIG. 3. During this translation, the axial skirt 58 of the seal 50 moves towards the peripheral wall 16 of the support 14 on the right-hand side, which applies a transversal compression force to the associated lateral segment 61, and it moves away from the peripheral wall 16 of the support 14 on the opposite side, here the left-hand side, which applies a transversal traction force to the associated lateral segment 61. Subjected to these compression, on the one side, and traction forces on the other, the segments 57, 61 of the connecting portion 56 are elastically deformed, the undulations of the sinusoidal profile tending to flatten on the side subjected to the traction force and to move towards each other on the side subjected to the compression force, while maintaining the tightness between the tactile panel 12 and the support 14. This is what is shown diagrammatically in dashed lines in FIG. 3.

It is noted that the seal 50 in accordance with the invention allows optimum tightness to be obtained in a small bulk, in particular due to the very simple manner of mounting of the seal 50 on the support 14 and on the tactile panel 12 and due to the structure of the seal. It is possible to obtain a haptic control device 10 of which the transversal thickness of the longitudinal segments 57 of the seal 50 is less than 5 millimeters and of which the transversal thickness of the lateral segments 61 is less than 8 millimeters. This allows the bulk of the seal 50 in a transversal plane to be minimized, minimizing the transversal space between the peripheral axial wall 16 of the support 14 and the framework 36 of the tactile panel 12

While this invention has been described in terms of the preferred embodiments thereof, it is not intended to be so limited, but rather only to the extent set forth in the claims that follow.

The invention claimed is:

1. A haptic control device comprising:
a tactile transversal panel mounted movably relative to a fixed support, wherein the support includes a peripheral wall that surrounds the tactile panel and extends generally towards a front of the tactile panel in an axial direction at right-angles to a plane of the tactile panel, wherein the tactile panel defines a tactile zone at the front and includes a drive system configured to provide a switching signal triggered when the tactile zone is brushed so that the tactile panel is driven by the drive system in the plane of the tactile panel for performing movements relative to the support;
a seal arranged on a periphery of the tactile panel in an annular space situated between the tactile panel and a peripheral wall of the support, wherein the seal includes
an inner portion in tight contact with the tactile panel;
an outer portion in tight contact with the peripheral wall of the support; and
a connecting portion that extends between the inner portion and the outer portion, wherein the connecting portion is elastically deformable so as to absorb the relative displacements of the tactile panel relative to the peripheral wall of the support without removing the haptic effect produced by the movements of the tactile panel.

2. The device as described in claim 1, wherein the inner portion of the seal includes an axial skirt that extends substantially in parallel with an adjacent wall of the tactile panel and is flattened against the adjacent wall of the tactile panel.

3. The device as described in claim 2, wherein the tactile panel includes a touchscreen mounted on a peripheral framework in the form of a frame, the framework including an outer axial wall, wherein the axial skirt is flattened against the outer axial wall.

4. The device as described in claim 1, wherein the outer portion of the seal is formed by an axial partition which extends generally in the extension of the peripheral wall of the support towards the front.

5. The device as described in claim 4, wherein the outer face of the peripheral wall of the support includes a shoulder surface orientated towards the front, wherein a rear end section of the outer portion of the seal is mounted bearing against the shoulder surface.

6. The device as described in claim 4, wherein the outer portion of the seal is mounted clamped on the peripheral wall of the support.

7. The device as described in claim 1, wherein the connecting portion has the form of a transversal partition.

8. The device as described in claim 1, wherein the connecting portion includes a profile elastically deformable in a transversal drive direction of the tactile panel relative to the support.

9. The device as described in claim 8, wherein the elastically deformable profile has an undulated form of sinusoidal type in an axial plane parallel with the transversal drive direction.

10. The device as described in claim 8, wherein the elastically deformable profile extends along the longitudinal segments of the connecting portion on either side of the tactile panel and in parallel with the transversal drive direction and the elastically deformable profile extends in the width of the lateral segments on either side of the tactile panel.

11. The device as described in claim 1, wherein the device further comprises a cover in the form of a frame mounted on the peripheral wall of the support so as to internally define an accessible zone of the tactile panel, wherein the cover is mounted bearing axially against the top of the seal.

12. The device as described in claim 11, wherein the cover includes a groove in a rear transversal face configured to receive an axial extension of the outer portion of the seal.

13. The device as described in claim 11 in combination with claim 3, wherein the inner portion of the seal includes an inner transversal extension interposed between the framework and the cover.

14. The device as described in claim 1, wherein the device further comprises a display screen arranged between the tactile panel and a back wall of the support.

\* \* \* \* \*